United States Patent
Chen et al.

(10) Patent No.: US 7,308,282 B2
(45) Date of Patent: Dec. 11, 2007

(54) COMMUNICATION CONTROL SYSTEM, COMMUNICATION CONTROL METHOD, BASE STATION AND MOBILE STATION

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 376 days.

(21) Appl. No.: 10/314,153

(22) Filed: Dec. 9, 2002

(65) Prior Publication Data
US 2003/0114167 A1 Jun. 19, 2003

(30) Foreign Application Priority Data
Dec. 10, 2001 (JP) ............ P2001-376420

(51) Int. Cl.
*H04B 7/00* (2006.01)
*H04B 1/00* (2006.01)
*H04Q 7/20* (2006.01)
*G01R 31/08* (2006.01)

(52) U.S. Cl. ............ 455/522; 455/453; 455/63.1; 370/229; 370/230

(58) Field of Classification Search ............ 455/574, 455/343.3, 522, 453, 63.1; 370/311, 229, 370/230
See application file for complete search history.

(56) References Cited

U.S. PATENT DOCUMENTS

| | | | |
|---|---|---|---|
| 5,883,887 A | | 3/1999 | Take et al. |
| 6,032,034 A | * | 2/2000 | Rabina et al. ............ 455/401 |
| 6,216,006 B1 | * | 4/2001 | Scholefield et al. ........ 455/450 |
| 6,501,959 B1 | * | 12/2002 | Seon ............ 455/522 |
| 6,603,761 B1 | * | 8/2003 | Wang et al. ............ 370/352 |
| 6,728,270 B1 | * | 4/2004 | Meggers et al. ............ 370/514 |
| 6,944,439 B2 | * | 9/2005 | Hayashi et al. ........... 370/395.2 |
| 6,959,196 B1 | * | 10/2005 | Yarkosky ............ 455/466 |
| 6,975,609 B1 | * | 12/2005 | Khaleghi et al. ........... 455/522 |

(Continued)

FOREIGN PATENT DOCUMENTS

CN 1278389 12/2000

(Continued)

OTHER PUBLICATIONS

What is.com, Differentiated Services, http://searchsmb.techtarget.com/sDefinition/0,290660,sid44_gci213845,00.html.*

(Continued)

*Primary Examiner*—Lester G. Kincaid
*Assistant Examiner*—Marisol Figueroa
(74) *Attorney, Agent, or Firm*—Oblon, Spivak, McClelland, Maier & Neustadt, P.C.

(57) ABSTRACT

It is an object to control the traffic that flows in a radio link to ensure the stability of the network as well as to prevent the deterioration of the communication quality due to the transmission of packets exceeding the capacity, and to increase the communication capacity. A communication control system in a packet mobile communication transmits a downlink packet from a base station to a mobile station via a radio network. The base station includes a transmission determiner that determines whether or not to transmit the downlink packet to the radio network in accordance with the state of congestion of the radio network and the traffic type (DSCP) of the downlink packet.

3 Claims, 7 Drawing Sheets

U.S. PATENT DOCUMENTS

| | | | |
|---|---|---|---|
| 6,985,700 B1 * | 1/2006 | Laakso et al. | 455/63.1 |
| 2002/0049062 A1 * | 4/2002 | Petersen | 455/453 |
| 2002/0055359 A1 * | 5/2002 | Andersson et al. | 455/426 |
| 2002/0193118 A1 * | 12/2002 | Jain et al. | 455/453 |
| 2003/0003921 A1 * | 1/2003 | Laakso | 455/453 |
| 2003/0198183 A1 * | 10/2003 | Henriques et al. | 370/229 |
| 2004/0009776 A1 * | 1/2004 | Ishikawa et al. | 455/453 |

FOREIGN PATENT DOCUMENTS

| | | |
|---|---|---|
| EP | 1 069 790 | 1/2001 |
| GB | 2 343 331 | 5/2000 |
| JP | 10-013937 | 1/1998 |
| JP | 11-017607 | 1/1999 |
| JP | 11-513868 | 11/1999 |
| JP | 2000-022628 | 1/2000 |
| JP | 2001-078260 | 3/2001 |
| JP | 2001-517893 | 10/2001 |
| JP | 2001-333458 | 11/2001 |
| WO | WO 97/16039 | 5/1997 |
| WO | WO 99/45736 | 9/1999 |
| WO | WO 01/13667 A1 | 2/2001 |
| WO | WO 01/93620 | 12/2001 |

OTHER PUBLICATIONS

Differentiated Services—a What is.com definition.*

R. Loukas, et al., 10$^{th}$ Mediterranean Electrotechnical Conference, MEleCon 2000, vol. 1, XP-001017019, pp. 19-22, "Fuzzy Red: Congestion Control for TCP/IP DIFF-SERV", May 29, 2000.

Derwent Abstract, AN 2001-442546, CN 1293497, May 2, 2001.

* cited by examiner

FIG.3

| TRAFFIC TYPE | EF(Expedited Forwarding) | AF(Assured Forwarding) | BE(Best Effort) |
|---|---|---|---|
| DSCP | 101110 | XXXYY0 | 000000 |
| PRIORITY | THE HIGHEST QUALITY AND PRIORITY CLASS | THE PRIORITY CLASS NEXT TO THE EF | BEST EFFORT COMMON TO Diffserv UNSUPPORTED ROUTER |

FIG.4

|  | CLASS 1 | CLASS 2 | CLASS 3 | CLASS 4 |
|---|---|---|---|---|
| LEVEL 1 (DISCARD PRIORITY : LOW) | 001010 | 010010 | 011010 | 100010 |
| LEVEL 2 (DISCARD PRIORITY : MIDDLE) | 001100 | 010100 | 011100 | 100100 |
| LEVEL 3 (DISCARD PRIORITY : HIGH) | 001110 | 010110 | 011110 | 100110 |

FIG.5

| TRAFFIC TYPE | EF | AF4 | AF3 | AF2 | AF1 | BE |
|---|---|---|---|---|---|---|
| ADMISSION THRESHOLD $N_i$ | 90% | 80% | 70% | 60% | 50% | 40% |

COMMUNICATION CONTROL SYSTEM, COMMUNICATION CONTROL METHOD, BASE STATION AND MOBILE STATION

CROSS REFERENCE TO RELATED APPLICATIONS

This application is based upon and claims the benefit of priority from the prior Japanese patent Applications No. P2001-376420, filed on Dec. 10, 2001; the entire contents of which are incorporated herein by reference.

BACKGROUND OF THE INVENTION

1. Field of the Invention

The present invention relates to a communication control system and a communication control method in packet mobile communication, and to abase station and a mobile station, which are suitable for being applied thereto.

2. Description of the Related Art

Traffic admission control is an essential technique to prevent congestion from occurring in the network, to ensure the stability of the network and to support Qos (Quality of Service), by controlling the traffic coming into a network. Particularly, since the radio communication (mobile communication) environment is limited in radio resources, the admission control of the traffic flowing in a radio link (network) is indispensable.

Conventionally, in the mobile communication environment based on circuit switching, "traffic admission control" based on the available number of channels allotted to each cell, or "traffic admission control" determining the number of users admitted simultaneously based on the monitored result of the loss probability or the deterioration rate, is carried out (refer to "Call admission control method and apparatus in mobile communication"; JP P1997-84105 A).

In ATM (Asynchronous Transfer Mode) communication environment, it is determined at the connection setting whether to permit the relevant connection setting request, to reject the relevant connection setting request, or to negotiate the connection setting conditions contained in the relevant connection setting request.

Further, conventionally, for the network state of congestion estimation carried out at the traffic admission control, buffer queue average length (refer to "Congestion prevention device and method thereof using RED": JP P2001-111556 A), or buffer queue usage rate (refer to "Congestion control system in intelligent network": JP P2000-358068) is used.

However, in packet mobile communication, since a channel is shared by a plurality of users, and the occurrence pattern and number of the packets such as voice packets and data packets change, there is a problem in that it is difficult to apply "traffic admission control" in a mobile communication environment based on the conventional circuit switching.

Also, in packet mobile communication, since it is a connectionless communication, there is a problem in that the "traffic admission control" used in an ATM communication environment, which is a connection-type communication, cannot be applied thereto.

Further, in conventional network state of congestion determination, the traffic type of packet is not taken into consideration. Therefore, when it is determined that the network is in a congested state, there is a problem in that the probability of the rejection of real-time traffic is increased, thereby resulting in a decrease in Qos.

Furthermore, in the packet mobile communication environment, the amount of radio resources creates a bottleneck more frequently than the capacity of the queue.

Accordingly, there is a problem in that it is difficult to estimate the state of congestion of the network using the average queue length or the queue usage rate.

BRIEF SUMMARY OF THE INVENTION

Accordingly, the invention has been proposed in view of the above-described problems.

An object of the invention is to control the traffic that flows in a radio link to ensure the stability of the network as well as to prevent the deterioration of communication quality due to the transmission of packets exceeding the capacity thereof, and to increase communication volume.

Another object of the invention is to increase communication quality by carrying out "traffic admission control" in accordance with the state of use of radio resources and the traffic type of a packet.

The gist of a first characteristic of the invention is a communication control system in a packet mobile communication that transmits a downlink packet from a base station to a mobile station via a radio network, wherein the base station comprises a transmission determiner for determining whether or not to transmit the downlink packet to the radio network in accordance with the state of congestion of the radio network and the traffic type of the downlink packet.

In the first characteristic of the invention, it is preferred that the transmission determiner estimates the state of congestion of the radio network in accordance with the state of use of transmission power resources in the base station.

In the first characteristic of the invention, it is preferred that the transmission determiner estimates the state of congestion of the radio network by comparing a predetermined threshold set for each traffic type of the downlink packet with the state of use of transmission power resources in the base station.

In the first characteristic of the invention, it is preferred that the traffic type is identified by means of a code point of a DiffServ IP packet (DSCP).

The gist of a second characteristic of the invention is a communication control system in a packet mobile communication that transmits an uplink packet from a mobile station to a base station via a radio network, wherein the base station comprises an admission determiner for determining whether or not to admit the uplink packet that is transmitted from the mobile station via the radio network in accordance with the state of congestion of the radio network and the traffic type of the uplink packet, and a notifier for notifying the determined result to the mobile station; the mobile station comprises a transmission determiner for determining whether or not to transmit the uplink packet to the radio network in accordance with the notified result.

In the second characteristic of the invention, it is preferred that the admission determiner estimate the state of congestion of the radio network in accordance with the state of use of reception power resources in the base station.

In the second characteristic of the invention, it is preferred that the admission determiner estimates the state of congestion of the radio network by comparing a predetermined threshold set for each traffic type of the uplink packet with the state of use of reception power resources in the base station.

In the second characteristic of the invention, it is preferred that the traffic type is identified by means of a code point of a DiffServ IP packet (DSCP).

The gist of a third characteristic of the invention is a communication control method in a packet mobile communication that transmits a downlink packet from a base station to a mobile station via a radio network comprising a step of A) determining, in the base station, whether or not to transmit the downlink packet to the radio network in accordance with the state of congestion of the radio network and the traffic type of the downlink packet.

The gist of a fourth characteristic of the invention is a communication control method in a packet mobile communication that transmits an uplink packet from a mobile station to a base station via a radio network, comprising the steps of: A) determining, in the base station, whether or not to admit the uplink packet transmitted from the mobile station via the radio network in accordance with the state of congestion of the radio network and the traffic type of the uplink packet; B) notifying, from the base station, the determined result to the mobile station; and C) determining, in the mobile station, whether or not to transmit the uplink packet to the radio network in accordance with the notified result.

The gist of a fifth characteristic of the invention is a base station that transmits a downlink packet to a mobile station via a radio network comprising a transmission determiner for determining whether or not to transmit the downlink packet to the radio network in accordance with the state of congestion of the radio network and the traffic type of the downlink packet.

The gist of a sixth characteristic of the invention is a base station that receives an uplink packet from a mobile station via a radio network comprising an admission determiner for determining whether or not to admit the uplink packet transmitted from the mobile station via the radio network in accordance with the state of congestion of the radio network and the traffic type of the uplink packet, and a notifier for notifying the determined result to the mobile station.

The gist of a seventh characteristic of the invention is a mobile station that transmits an uplink packet to a base station via a radio network comprising a transmission determiner for determining whether or not to transmit the uplink packet to the radio network by the base station in accordance with the state of congestion of the radio network and the traffic type of the uplink packet.

BRIEF DESCRIPTION OF THE SEVERAL VIEWS OF THE DRAWINGS

FIG. 3 is a diagram showing traffic types according to an embodiment of the invention.

FIG. 4 is a diagram showing traffic types according to an embodiment of the invention.

FIG. 5 is a diagram showing an admission threshold for each traffic type according to an embodiment of the invention.

DETAILED DESCRIPTION OF THE INVENTION (Configuration of a communication control system according to an embodiment of the invention)

Figure 1:
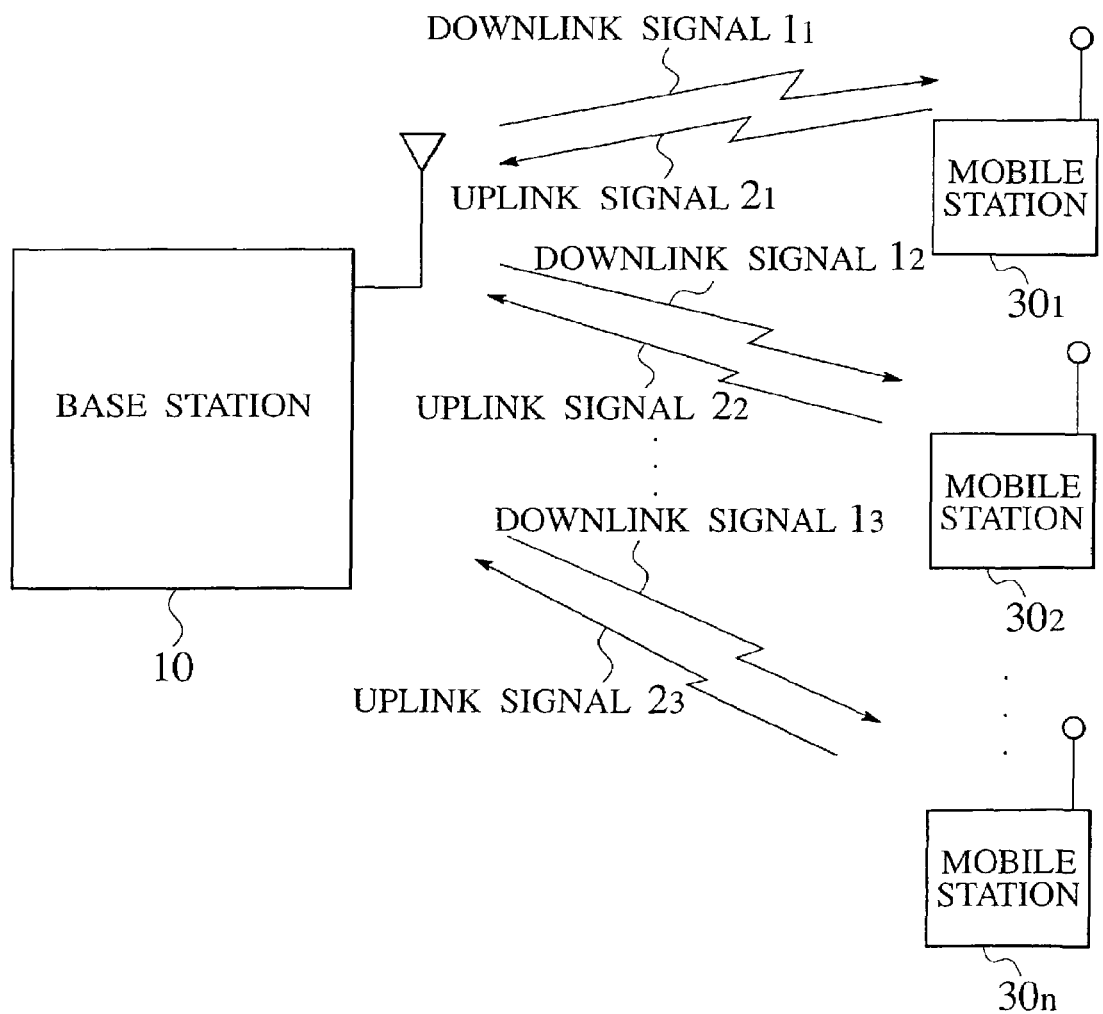
FIG. 1 is an illustration showing a packet mobile communication environment including a communication control system according to an embodiment of the invention.

The configuration of a communication control system according to an embodiment of the invention will be described with reference to the drawings. FIG. 1 is an illustration showing a packet mobile communication environment including the communication control system according to the embodiment of the invention.

The packet mobile communication environment shown in FIG. 1 is configured with a base station 10 and a plurality of mobile stations $30_1$ to $30_n$.

In FIG. 1, the plurality of mobile stations $30_1$ to $30_n$ are connected to the base station 10, downlink signals $1_1$ to $1_n$ are transmitted from the base station 10 to the plurality of mobile stations $30_1$ to $30_n$, and uplink signals $2_1$ to $2_n$ are transmitted from the plurality of mobile stations $30_1$ to $30_n$ to the base station 10.

In the packet mobile communication environment, in which a downlink packet 3 (downlink signal 1) is transmitted from the base station 10 to a mobile station 30 and an uplink packet 4 (uplink signal 2) is transmitted from the mobile station 30 to the base station 10 via a radio network, the communication control system according to the embodiment performs traffic admission control and network congestion control. The above is achieved by the functions provided to the base station 10 and the plurality of mobile stations $30_1$ to $30_n$.

Among the functions provided to the base station 10 and the plurality of mobile stations $30_1$ to $30_n$, those relevant to the communication control system according to the embodiment will be described.

Figure 2:
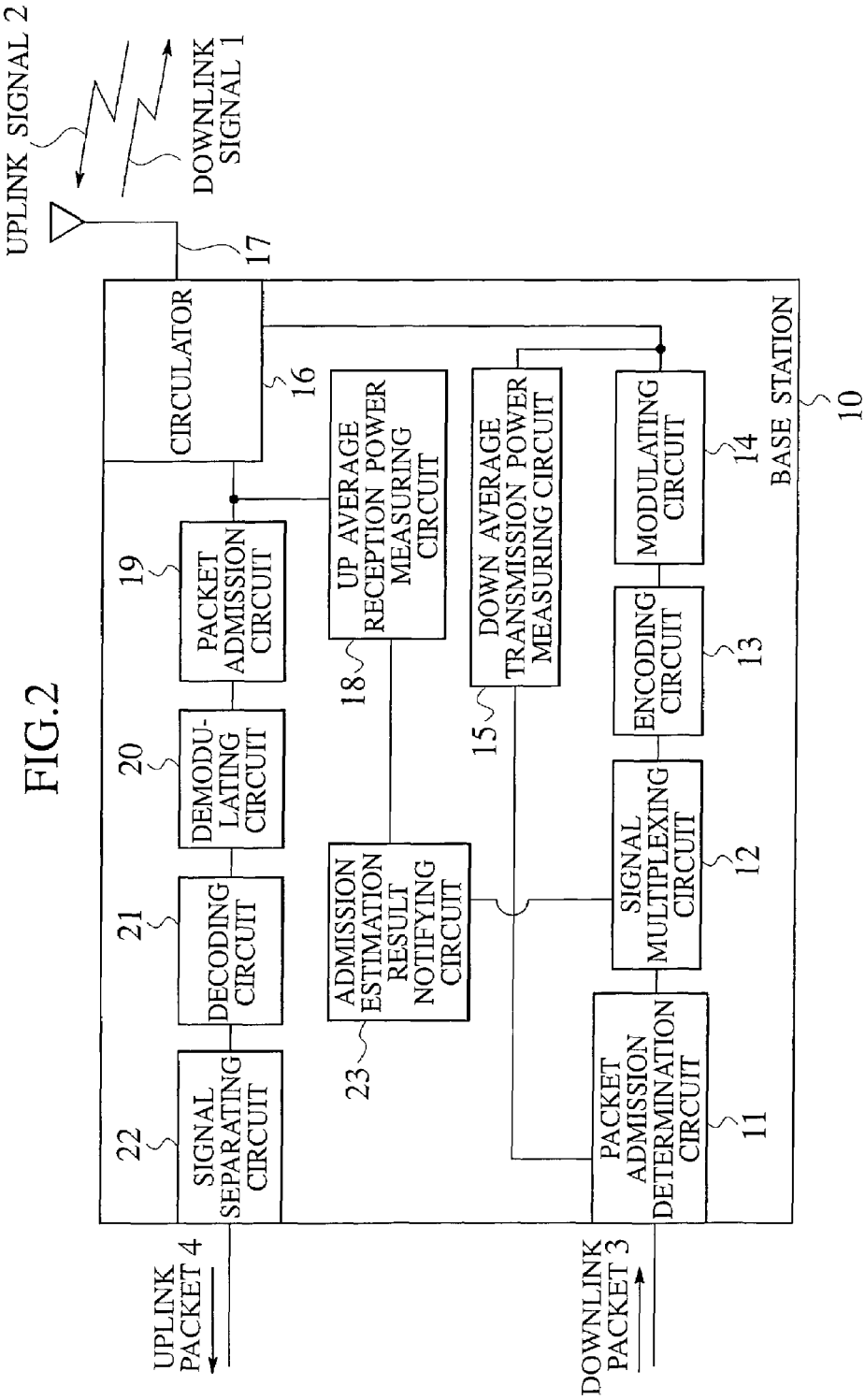
FIG. 2 is a functional block diagram of a base station according to an embodiment of the invention.

As shown in FIG. 2, the base station 10 comprises a packet admission determination circuit 11, a signal multiplexing circuit 12, an encoding circuit 13, a modulating circuit 14, a down average transmission power measuring circuit 15, a circulator 16, a radio antenna 17, an up average reception power measuring circuit 18, a packet admission circuit 19, a demodulating circuit 20, a decoding circuit 21, a signal separating circuit 22, and an admission estimation result notifying circuit 23.

According to the embodiment, the packet admission determination circuit 11 constitutes a transmission determiner configured to determine whether or not to transmit a downlink packet 3 to the radio network according to the state of congestion of the radio network and the traffic type of the downlink packet 3.

Also, the up average reception power measuring circuit 18 and the admission estimation result notifying circuit 23 constitute an admission determiner configured to determine whether or not to admit the uplink packet 4 transmitted from the mobile station 30 via the radio network according to the state of congestion of the radio network and the traffic type of the uplink packet 4, and a notifier configured to notify the determined result to the mobile station 30.

The packet admission determination circuit 11, which is connected to the signal multiplexing circuit 12 and to the down average transmission power measuring circuit 15, estimates the network state of congestion according to the down average transmission power transferred from the down average transmission power measuring circuit 15 and to the traffic type of the downlink packet 3.

The packet admission determination circuit 11 determines whether or not to admit the downlink packet 3 received from the superior network (a switching center, a radio network controller or the like) based on the estimated result, and transfers the downlink packet 3, that it is determined to admit, to the signal multiplexing circuit 12.

According to the embodiment, it is assumed that the traffic type of the packet is identified by a "code point of a DiffServ IP packet: Diffserv Code Point (DSCP)" that is set in the packet header of the relevant packet.

However, the invention is not limited to the above. The traffic type of the packet may be determined in such manner that the traffic type is notified at the time of reserving radio resources, and so on.

Referring to FIG. 3 and FIG. 4, the traffic types of the packets used in the embodiment will be described. As the traffic types of the packets used in the embodiment, as shown FIG. 3, three types are defined; i.e., an "EF (Expedited Forwarding) type", an "AF (AssuredForwarding) type" and a "BE (Best Effort) type".

And further, as shown in FIG. 4, the "AF type" is classified into four classes (class 1 to 4) in accordance with priority (packet transmission speed, buffer length or the like). The four classes are categorized into three levels (level 1 to 3) respectively on the basis of discard priority.

The "DSCP" of a packet of the "EF type" is "101110"; the "DSCP" of a packet of the "AF type" is "XXXYY0"; and the "DSCP" of a packet of the "BE type" is "000000".

The "DSCP" of a packet of the "AF type/class 1/level 1" is "001010"; the "DSCP" of a packet of the "AF type/class 1/level 2" is "001100"; and the "DSCP" of a packet of the "AF type/class 1/level 3" is "001110".

The "DSCP" of a packet of the "AF type/class 2/level 1" is "010010"; the "DSCP" of a packet of the "AF type/class 2/level 2" is "010100"; and the "DSCP" of a packet of the "AF type/class 2/level 3" is "010110".

The "DSCP" of a packet of the "AF type/class 3/level 1" is "011010"; the "DSCP" of a packet of the "AF type/class 3/level 2" is "011100"; and the "DSCP" of a packet of the "AF type/class 3/level 3" is "011110".

The "DSCP" of a packet of the "AF type/class 4/level 1" is "100010"; the "DSCP" of a packet of the "AF type/class 4/level 2" is "100100"; and the "DSCP" of a packet of the "AF type/class 4/level 3" is "100110".

The "EF type" defines the packets classified in the highest class in quality and priority. The "AF type" defines the packets classified in the class next in priority to the "EF type". The "BE type" defines best-effort type packets.

Hereinafter, the "AF type/class 1/level 1 to 3" will be referred to, generically, as "AF1 type"; the "AF type/class 2/level 1 to 3" will be referred to, generically, as "AF2 type"; the "AF type/class 3/level 1 to 3" will be referred to, generically, as "AF3 type"; and the "AF type/class 4/level 1 to 3" will be referred to, generically, as "AF4 type".

In the embodiment, packets of "EF type" are defined as "real-time type" packets. The other traffic type packets are defined as "non-real-time type" packets.

Specifically, the packet admission determination circuit 11 calculates the "down radio resources usage rate (state of use of transmission power resources in the base station 10) R" in order to estimate the network state of congestion.

Herein, the term "down radio resources usage rate R" means the proportion of the "down maximum transmission power" occupied by "down average transmission power".

Also, the term "down average transmission power" means a time average of the down transmission power per predetermined period of time. For example, the term "down average transmission power" means a time average of the down transmission power for each time slot within each frame that has already been transmitted by the base station 10.

Further, the term "down maximum transmission power" means a maximum value of the power by which the base station 10 can transmit the downlink signal 1.

When the down radio resources usage rate R is smaller than the admission threshold $N_i$ of the traffic type of the downlink packet 3, the packet admission determination circuit 11 determines to admit the downlink packet 3.

On the other hand, when the down radio resources usage rate R is equal to or larger than the admission threshold $N_i$ of the traffic type of the down link packet 3, the packet admission determination circuit 11 determines not to admit the downlink packet 3 in the case where the downlink packet 3 is real time traffic (i.e., packet of "EF type"); and determines to buffer the downlink packet 3 in the case where the downlink packet 3 is non-real-time traffic (i.e. packet other than "EF type").

FIG. 5 shows admission threshold $N_1$ for each traffic type. The symbol "i" denotes a traffic type ("EF type", "AF4 type", "AF3 type ", "AF2 type", "AF1 type" or "BE type").

In the embodiment, as shown in FIG. 5, the admission threshold $N_{EF}$ is set to 90%; the admission threshold $N_{AF4}$ is set to 80%; the admission threshold $N_{AF3}$ is set to 70%; the admission threshold $N_{AF2}$ is set to 60%; the admission threshold $N_{AF1}$ is set to 50%; and the admission threshold $N_{BE}$ is set to 40%.

The packet admission determination circuit 11 renews the radio resources usage rate R in accordance with the down average transmission power from the down average transmission power measuring circuit 15 at every predetermined period of time (for example, every frame).

The signal multiplexing circuit 12 is connected to the packet admission determination circuit 11, the encoding circuit 13, and the admission estimation result notifying circuit 23; and multiplexes the downlink packet 3 from the packet admission determination circuit 11 and an admission estimation result from the admission estimation result notifying circuit 23, and transmits it to the encoding circuit 13.

The encoding circuit 13 is connected to the signal multiplexing circuit 12 and the modulating circuit 14; and encodes the multiplexed signal from the signal multiplexing circuit 12, and transmits it to the modulating circuit 14.

The modulating circuit 14 is connected to the encoding circuit 13, the down average transmission power measuring circuit 15, and the circulator 16; and modulates the encoded signal from the encoding circuit 13, and transmits it to the down average transmission power measuring circuit 15 and the circulator 16.

The down average transmission power measuring circuit 15 is connected to the packet admission determination circuit 11 and the modulating circuit 14; and monitors the modulated signal from the modulating circuit 14 to measure the down average transmission power. The measured down average transmission power is transmitted to the packet admission determination circuit 11.

The down average transmission power measuring circuit 15 measures the down average transmission power at every predetermined period of time (for example, at every time slot within the frame).

The circulator 16 is connected to the modulating circuit 14, the radio antenna 17, the up average reception power measuring circuit 18 and the packet admission determination circuit 19; and switches between the transmission process of the downlink signal 1 transferred from the modulating circuit 14 to the radio antenna 17, and the reception process of the uplink signal 2 transferred from the radio antenna 17 to the packet admission determination circuit 19 and the up average reception power measuring circuit 18.

The up average reception power measuring circuit 18 is connected to the circulator 16 and the admission estimation result notifying circuit 23; and monitors the uplink signal 2 from the circulator 16 to measure the up average reception power, and transmits the measured up average reception power to the admission estimation result notifying circuit 23.

The up average reception power measuring circuit 18 measures the up average reception power every predetermined period of time (for example, every time slot in the frame).

Herein, the up average reception power measuring circuit 18 may measure the average value of "SIR (Signal to Interference Power Ratio)" every predetermined period of time, as the up average reception power, in place of measuring the average value of the up average reception power level at every predetermined period of time.

The packet admission circuit 19 is connected to the circulator 16 and the demodulating circuit 20; and admits the uplink signal 2 from the circulator 16, to transmit the admitted uplink signal 2 to the demodulating circuit 20.

The demodulating circuit 20 is connected to the packet admission circuit 19 and the decoding circuit 21; and demodulates the uplink signal 2 from the packet admission circuit 19, and transfers it to the decoding circuit 21.

The decoding circuit 21 is connected to the demodulating circuit 20 and the signal separating circuit 22; and decodes the demodulated signal from the demodulating circuit 20, and transmits it to the signal separating circuit 22.

The signal separating circuit 22 is connected to the decoding circuit 21; and separates the decoded signal from the decoding circuit 21 and extracts the uplink packet 4 to transmit the extracted uplink packet 4 to the superior network.

The admission estimation result notifying circuit 23 is connected to the signal multiplexing circuit 12 and the up average reception power measuring circuit 18.

The admission estimation result notifying circuit 23 estimates the state of congestion of the radio network in accordance with the up average reception power from the up average reception power measuring circuit 18; determines whether or not to receive the uplink packet 4 of each traffic type based on the estimated result, and transmits the determined admission estimation result (to receive or not to receive) to the signal multiplexing circuit 12.

Specifically, in order to estimate the state of congestion of the radio network, the admission estimation result notifying circuit 23 calculates the "up radio resources usage rate (state of use of reception power resources in the base station 10) R".

Herein, the term "up radio resources usage rate R" means the proportion of the "up maximum reception power" occupied by "up average reception power"

The term "up average reception power" means the time average of the up reception power at every predetermined period of time, for example, the time average of the up reception power in each time slot in the frame that has been received by the base station 10.

The term "up maximum reception power" means the maximum value of power by which the base station 10 can receive the uplink signal 2.

When the up radio resources usage rate R is smaller than the admission threshold $N_i$ of the traffic type i, the admission estimation result notifying circuit 23 determines to admit the uplink packet 4 (uplink signal 2) of the traffic type i.

On the other hand, when the up radio resources usage rate R is equal to or larger than the admission threshold $N_i$ of the traffic type i, the admission estimation result notifying circuit 23 determines not to admit the uplink packet 4 (uplink signal 2) of the traffic type i.

Figure 6:
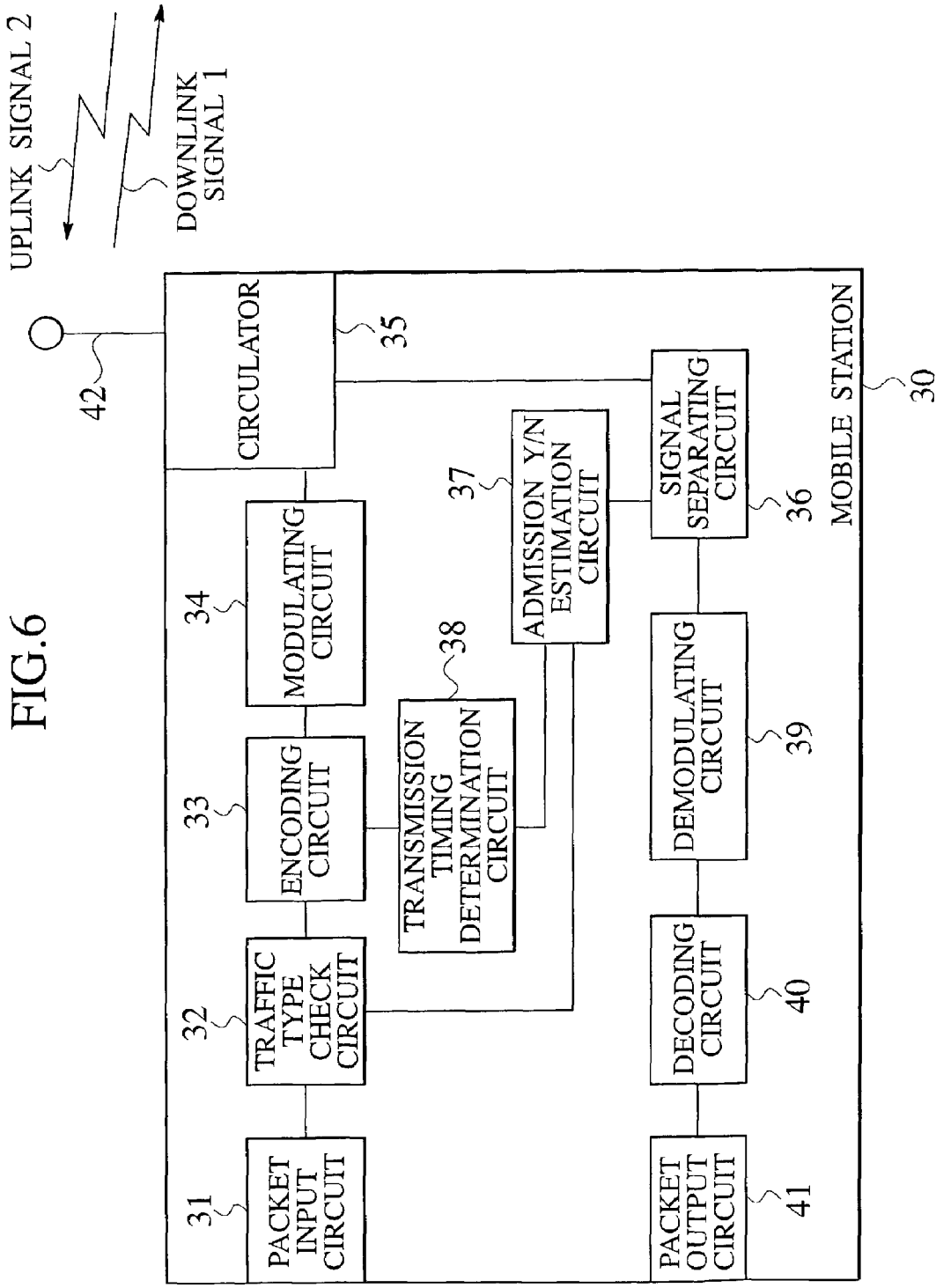
FIG. 6 is a functional block diagram of a mobile station according to an embodiment of the invention.

As shown in FIG. 6, the mobile station 30 comprises a packet input circuit 31, a traffic type check circuit 32, an encoding circuit 33, a modulating circuit 34, a circulator 35, a signal separating circuit 36, an admission Y/N judgment circuit 37, a transmission timing determination circuit 38, a demodulating circuit 39, a decoding circuit 40 and a packet output circuit 41.

According to the embodiment, the admission Y/N judgment circuit 37 constitutes a transmission determiner configured to determine whether or not to transmit the uplink packet 4 to the radio network in accordance with the result notified from the base station 10.

The packet input circuit 31 is connected to the traffic type check circuit 32. The packet input circuit 31 is an input interface for allowing a user of the mobile station 30 to input data (including voice data); and generates the uplink packet 4 based on the input data to transmit to the traffic type check circuit 32. When generating the uplink packet 4, the packet input circuit 31 sets a DSCP (traffic type) in the packet header in accordance with the content of the data.

The traffic type check circuit 32 is connected to the packet input circuit 31, the encoding circuit 33 and the admission Y/N judgment circuit 37; and checks the traffic type of the uplink packet 4 based on the DSCP in the packet header of the uplink packet 4 from the packet input circuit 31.

Also, the traffic type check circuit 32 transmits the checked traffic type to the admission Y/N judgment circuit 37 and transmits the uplink packet 4 from the packet input circuit 31 to the encoding circuit 33.

The encoding circuit 33 is connected to the traffic type check circuit 32, the modulating circuit 34 and the transmission timing determination circuit 38; and encodes the uplink packet 4 from the traffic type check circuit 32 in accordance with the transmission timing from the transmission timing determination circuit 38, and transfers it to the modulating circuit 34.

The modulating circuit 34 is connected to the encoding circuit 33 and the circulator 35; and modulates the encoded signal from the encoding circuit 33, and transfers it to the circulator 35.

The circulator 35 is connected to the modulating circuit 34 and the radio antenna 42; and switches between the transmission process of an uplink signal 2 from the modulating circuit 34 to the radio antenna 42, and the reception process of a downlink signal 1 from the radio antenna 42 to the signal separating circuit 36.

The signal separating circuit 36 is connected to the circulator 35, the admission Y/N judgment circuit 37 and the demodulating circuit 39. The signal separating circuit 36 separates the admission estimation result in the downlink signal 1 from the circulator 35 to transmit to the admission Y/N judgment circuit 37; and transmits the rest thereof to the demodulating circuit 39.

The admission Y/N judgment circuit 37 is connected to the traffic type check circuit 32, the signal separating circuit 36 and the transmission timing determination circuit 38; and judges whether or not the traffic type of the uplink packet 4 is admitted by the base station 10 in accordance with the traffic type from the traffic type check circuit 32 and the admission estimation result from the signal separating circuit 36, and notifies the judged result to the transmission timing determination circuit 38.

The transmission timing determination circuit 38 is connected to the encoding circuit 33 and the admission Y/N judgment circuit 37; and generates transmission timing in accordance with the judged result from the admission Y/N judgment circuit 37, and transmits it to the encoding circuit 33.

The transmission timing determination circuit 38 does not generate the transmission timing when the result judged by the admission Y/N judgment circuit 37 is such that the traffic type of the uplink packet 4 is not admitted by the base station 10. As a result, the encoding circuit 33 does not encode the uplink packet 4.

The demodulating circuit 39 is connected to the signal separating circuit 36 and the decoding circuit 40; and demodulates the downlink signal 1 from the signal separating circuit 36, and transmits it to the decoding circuit 40.

The decoding circuit 40 is connected to the demodulating circuit 39 and the packet output circuit 41; and decodes the demodulated signal from the demodulating circuit 39, and transmits it to the packet output circuit 41.

The packet output circuit 41 is connected to the decoding circuit 40; and is an output interface that restores the downlink packet 3 in accordance with the decoded signal from the decoding circuit 40, and that outputs data (including voice data) to the user of the mobile station 30 according to the restored downlink packet 3.

(Operation of the Communication Control System According to the Embodiment)

Referring to drawings, the operation of the communication control system having the configuration as described above will be described.

Figure 7:
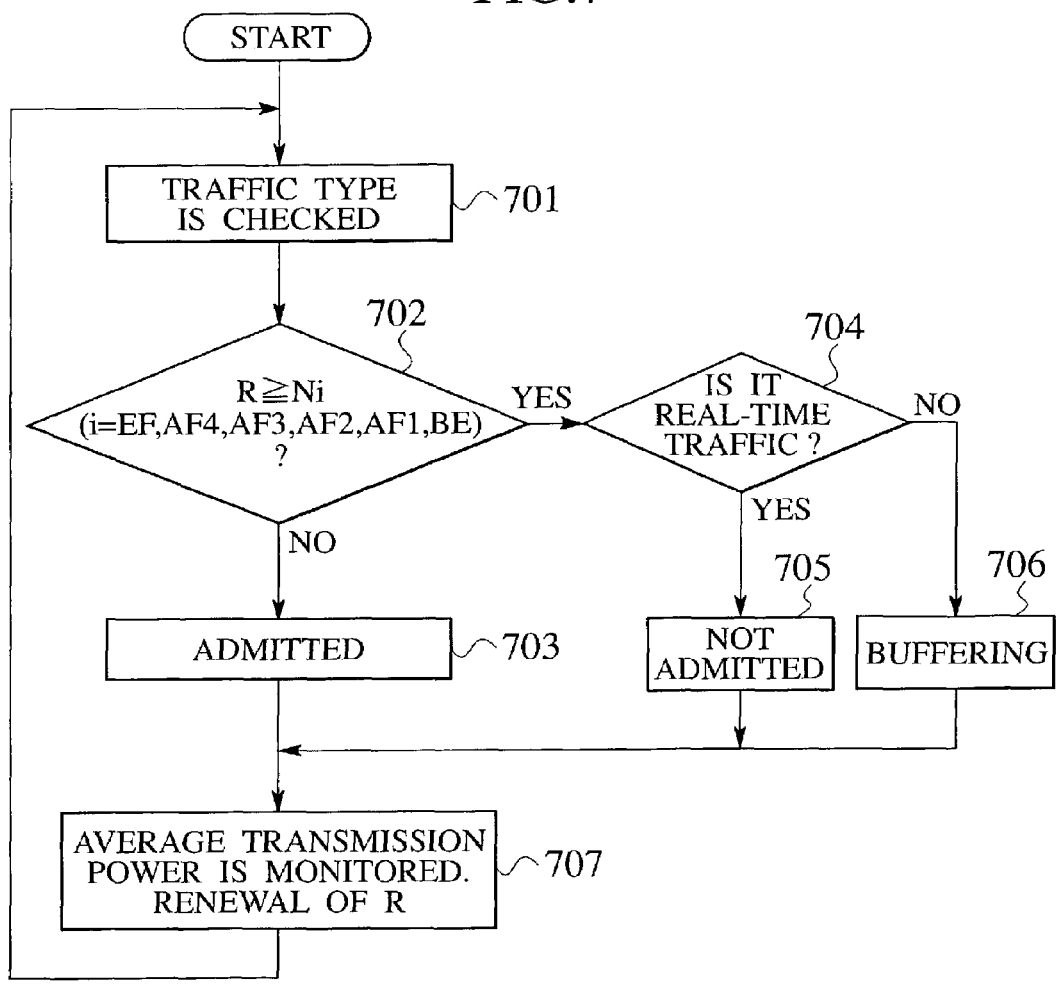
FIG. 7 is a flowchart diagram illustrating an operation of the base station when a communication control system according to an embodiment of the invention performs a traffic admission control with respect to a downlink packet.

FIG. 7 is a flowchart diagram illustrating an operation of the base station 10 when the communication control system according to the embodiment performs a traffic admission control with respect to a downlink packet.

Figure 8:
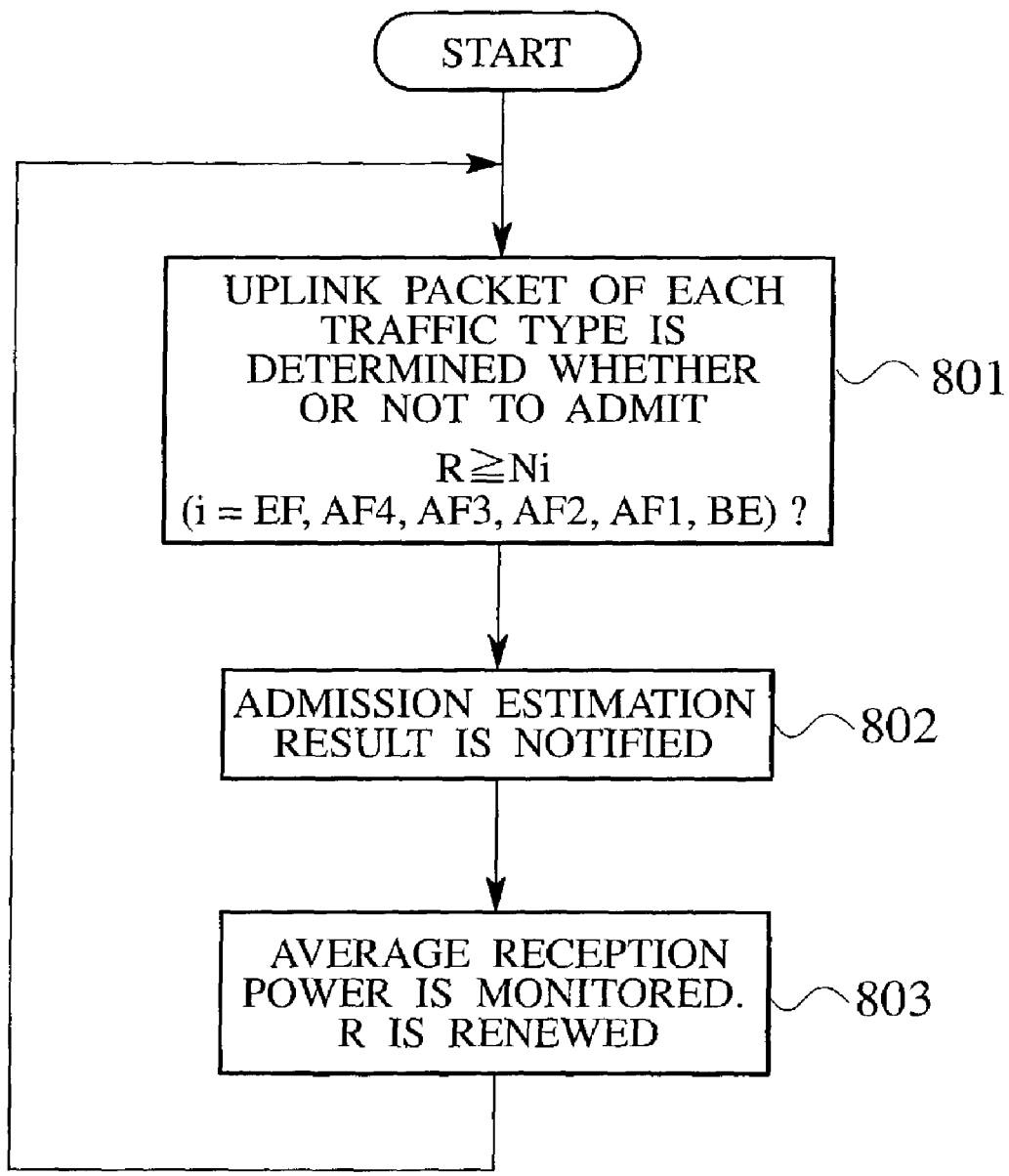
FIG. 8 is a flowchart diagram illustrating an operation of the base station when a communication control system according to an embodiment of the invention performs a traffic admission control with respect to an uplink packet.

FIG. 8 is a flowchart diagram illustrating an operation of the base station 10 when the communication control system according to the embodiment performs a traffic admission control with respect to an uplink packet.

Figure 9:
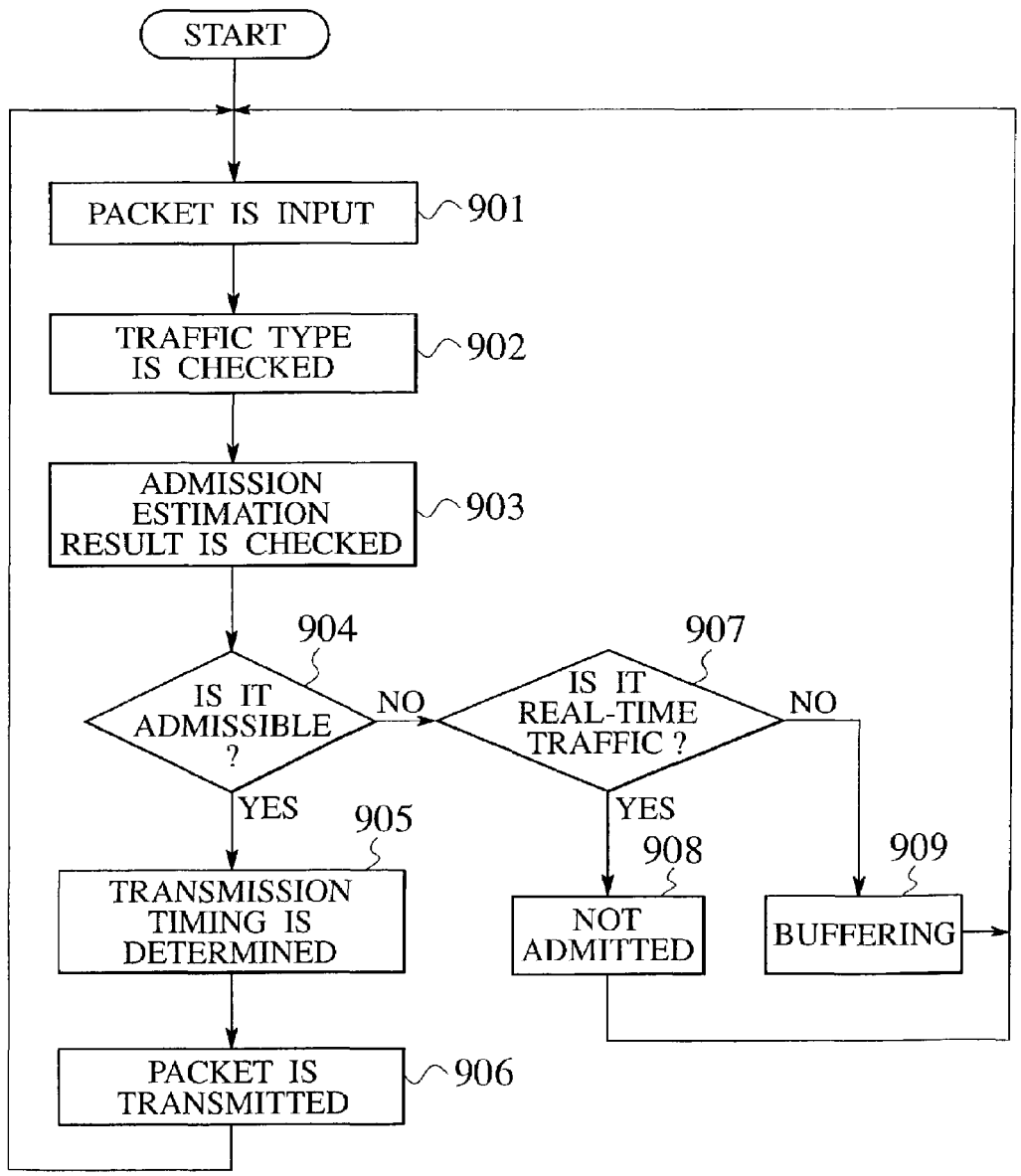
FIG. 9 is a flowchart diagram illustrating an operation of the mobile station when a communication control system according to an embodiment of the invention performs a traffic admission control with respect to a downlink packet.

FIG. 9 is a flowchart diagram illustrating an operation of the mobile station 30 when the communication control system according to the embodiment performs a traffic admission control with respect to an uplink packet.

First of all, the operation of the base station 10 when the communication control system according to the embodiment performs the traffic admission control with respect to the downlink packet 3 will be described.

As shown in FIG. 7, in step 701, the packet admission determination circuit 11 checks the traffic type of the downlink packet 3 by checking the DSCP set in the packet header of the downlink packet 3 received from the superior network.

In step 702, the packet admission determination circuit 11 compares the down radio resources usage rate R with the admission threshold $N_i$ of traffic type of the downlink packet 3.

When the down radio resources usage rate R is smaller than the admission threshold $N_i$ of traffic type of the downlink packet 3, in step 703, the packet admission determination circuit 11 determines to admit the downlink packet 3. The admitted downlink packet 3 is transmitted to the mobile station 30 via the signal multiplexing circuit 12, the encoding circuit 13, the modulating circuit 14, the circulator 16 and the radio antenna 17. Then, the operation proceeds to step 707.

When the down radio resources usage rate R is equal to or larger than the admission threshold $N_i$ of traffic type of the downlink packet 3, in step 704, the packet admission determination circuit 11 determines whether or not the downlink packet 3 is a real time traffic (packet of "EF type").

When the downlink packet 3 is real time traffic, in step 705, the packet admission determination circuit 11 determines not to admit the downlink packet 3. And the packet admission determination circuit 11 notifies the fact to the superior network. Then, the operation proceeds to step 707.

When the downlink packet 3 is not real time traffic, in step 706, the packet admission determination circuit 11 determines to buffer the downlink packet 3. Then, the operation proceeds to step 707.

In step 707, the down average transmission power measuring circuit 15 measures the down average transmission power at every predetermined period of time (for example, every time slot in the frame), and transfers it to the packet admission determination circuit 11.

The packet admission determination circuit 11 renews the down radio resources usage rate R by recalculating the same in accordance with the down average transmission power value received from the down average transmission power measuring circuit 15. Then, the operation returns to step 701.

Secondly, the operation of the base station 10 when the communication control system according to the embodiment performs the traffic admission control with respect to the uplink packet 4 will be described.

As shown in FIG. 8, in step 801, the admission estimation result notifying circuit 23 estimates the state of congestion of the radio network in accordance with the up average reception power from the up average reception power measuring circuit 18, determines whether or not to admit the uplink packet 4 of each traffic type in accordance with the estimated result, and transfers the determined admission estimation result (to admit or not to admit) to the signal multiplexing circuit 12.

Specifically, the admission estimation result notifying circuit 23 compares the up radio resources usage rate R with the admission threshold $N_i$ of traffic type of the uplink packet 4.

When the up radio resources usage rate R is smaller than the admission threshold $N_i$ of the traffic type i, the admission estimation result notifying circuit 23 determines to admit the uplink packet 4 of the traffic type i.

On the other hand, when the up radio resources usage rate R is equal to or larger than the admission threshold $N_i$ of the traffic type i, the admission estimation result notifying circuit 23 determines not to admit the uplink packet 4 of the traffic type i.

In step 802, the above-described admission estimation result is multiplexed with the downlink packet 3 by the signal multiplexing circuit 12 and transferred to the mobile station 30 via the encoding circuit 13, the modulating circuit 14, the circulator 16 and the radio antenna 17.

In step 803, the up average reception power measuring circuit 18 measures the up average reception power at every predetermined period of time (for example, every time slot in the frame), and transmits it to the admission estimation result notifying circuit 23.

The admission estimation result notifying circuit 23 renews the up radio resources usage rate R by recalculating the same in accordance with the up average reception power value received from the up average reception power measuring circuit 18. Then, the operation returns to step 801.

Thirdly, the operation of the mobile station 30 when the communication control system according to the embodiment performs the traffic admission control with respect to the uplink packet 4 will be described.

As shown in FIG. 9, in step 901, the packet input circuit 31 generates an uplink packet 4 based on the data input by a user of the mobile station 30.

At the step 902, the traffic type check circuit 32 checks the traffic type of the uplink packet 4 by checking the DSCP set in the packet header of the generated uplink packet 4.

In step 903, the admission Y/N judgment circuit 37 receives the admission estimation result transferred from the base station 10 via the circulator 35 and checks the contents thereof.

In step 904, the admission Y/N judgment circuit 37 judges whether or not to admit the uplink packet 4 in accordance with the above-described admission estimation result and the traffic type of the uplink packet 4 from the traffic check circuit 32.

When the circuit 37 judges to admit the uplink packet 4, in step 905, the transmission timing determination circuit 38 generates the transmission timing.

And then, in step 906, the uplink packet 4 is transmitted to the base station 10 via the encoding circuit 33, the modulating circuit 34, the circulator 35 and the radio antenna 42. Then, the operation returns to step 901.

When the circuit 37 judges not to admit the uplink packet 4, in step 907, the admission Y/N judgment circuit 37 estimates whether or not the uplink packet 3 is real time traffic (packet of "EF type").

When the uplink packet 3 is real time traffic, in step 908, the admission Y/N judgment circuit 37 rejects the admission of the uplink packet 4, and notifies the fact to the user of the mobile station 30. Then, the operation returns to step 901.

When the uplink packet 3 is not real time traffic, in step 909, the admission Y/N judgment circuit 37 buffers the uplink packet 4. Then, the operation returns to step 901.

(Operation and Working-effect of the Communication Control System According to the Embodiment)

In the communication control system according to the embodiment, since the packet admission determination circuit 11 of the base station 10 determines whether or not to transmit the downlink packet 3 in accordance with the state of congestion of the radio network, it is possible to control the down traffic that flows in a radio link to ensure the stability of the network, to prevent the deterioration in the communication quality due to transmission of downlink packets 3 exceeding the capacity, and to increase the communication capacity.

Also, in the communication control system according to the embodiment, since the packet admission determination circuit 11 of the base station 10 determines whether or not to transmit the downlink packet 3 in accordance with the traffic type (DSCP) of the downlink packet 3, it is possible to perform "traffic admission control" in accordance with the traffic type (DSCP) of the downlink packet 3 resulting in an enhanced communication quality.

Further, in the communication control system according to the embodiment, the up average reception power measuring circuit 18 and the admission estimation result notifying circuit 23 of the base station 10 determines whether or not to admit the uplink packet 4 in accordance with the state of congestion of the radio network, and the admission Y/N judgment circuit 37 of the mobile station 30 determines whether or not to transmit the uplink packet 4 in accordance with the admission estimation result; therefore it is possible to control the up traffic that flow in the radio link to ensure the stability of the network, to prevent the deterioration of the communication quality due to the transmission quality of uplink packets 4 exceeding capacity, and to increase communication capacity.

Furthermore, owing to the communication control system according to the embodiment, the up average reception power measuring circuit 18 and the admission estimation result notifying circuit 23 of the base station 10 determine whether or not to admit the uplink packet 4 in accordance with the traffic type (DSCP) of the up link packet 4, and the admission Y/N judgment circuit 37 of the mobile station 10 determines whether or not to transmit the uplink packet 4 in accordance with the admission estimation result; therefore it is possible to perform "traffic admission control" in accordance with the traffic type (DSCP) of the uplink packet 4 resulting in enhanced communication quality.

As described above, according to the invention, it is possible to control the traffic flowing in a radio link to ensure the stability of the network, to prevent the deterioration of the communication quality due to the quality of packets transmitted exceeding capacity, and to increase communication capacity.

Further, according to the invention, it is possible to perform "traffic admission control" in accordance with the radio resource usage state and the traffic type of the packet resulting in enhanced communication quality.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communication control system in a packet mobile communication that transmits a downlink IP packet from a base station to a mobile station via a radio network, wherein:
   the base station comprises an admission determiner configured to manage an admission threshold of an usage rate of transmission power resources in the base station for each traffic type of an IP packet,
   to determine a traffic type of the downlink IP packet based on a code point of a DiffServ IP packet (DSCP) set in a packet header of the downlink IP packet from a superior network,
   to compare the admission threshold of the determined traffic type with the usage rate of the transmission power resources in the base station,
   to determine to admit the downlink IP packet from the superior network, when the usage rate of the transmission power resources in the base station is smaller than the admission threshold of the determined traffic type, to determine not to admit the downlink IP packet from the superior network, when the usage rate of the transmission power resources in the base station is equal to or larger than the admission threshold of the determined traffic type and when the determined traffic type is a real-time traffic, and to determine to buffer the downlink IP packet from the superior network, when the usage rate of the transmission power resources in the base station is equal to or larger than the admission threshold of the determined traffic type and when the determined traffic type is a non-real-time traffic.

2. A communication control method in a packet mobile communication that transmits a downlink IP packet from a base station to a mobile station via a radio network, the method comprising:

managing an admission threshold of an usage rate of transmission power resources in the base station for each traffic type of an IP packet;

determining a traffic type of the downlink IP packet based on a code point of a DiffServ IP racket (DSCP) set in a packet header of the downlink IP packet from a superior network;

comparing the admission threshold of the determined traffic type with the usage rate of the transmission power resources in the base station;

determining to admit the downlink IP packet from the superior network, when the usage rate of the transmission power resources in the base station is smaller than the admission threshold of the determined traffic type;

determining not to admit the downlink IP packet from the superior network, when the usage rate of the transmission power resources in the base station is equal to or larger than the admission threshold of the determined traffic type and when the determined traffic type is a real-time traffic; and determining to buffer the downlink IP packet from the superior network, when the usage rate of the transmission power resources in the base station is equal to or larger than the admission threshold of the determined traffic type and when the determined traffic type is a non-real-time traffic.

3. A base station that transmits a downlink IP packet to a mobile station via a radio network, the base station comprising:

an admission determiner configured to manage an admission threshold of an usage rate of transmission power resources in the base station for each traffic type of an IP packet, to determine a traffic type of the downlink IP packet based on a code point of a DiffServ IP packet (DSCP) set in a packet header of the downlink IP packet from a superior network, to compare the admission threshold of the determined traffic type with the usage rate of the transmission power resources in the base station, to determine to admit the downlink IP packet from the superior network, when the usage rate of the transmission power resources in the base station is smaller than the admission threshold of the determined traffic type, to determine not to admit the downlink IP packet from the superior network, when the usage rate of the transmission power resources in the base station is equal to or larger than the admission threshold of the determined traffic type and when the determined traffic type is a real-time traffic, and to determine to buffer the downlink IP packet from the superior network, when the usage rate of the transmission power resources in the base station is equal to or larger than the admission threshold of the determined traffic type and when the determined traffic type is a non-real-time traffic.

* * * * *